Patented July 13, 1948

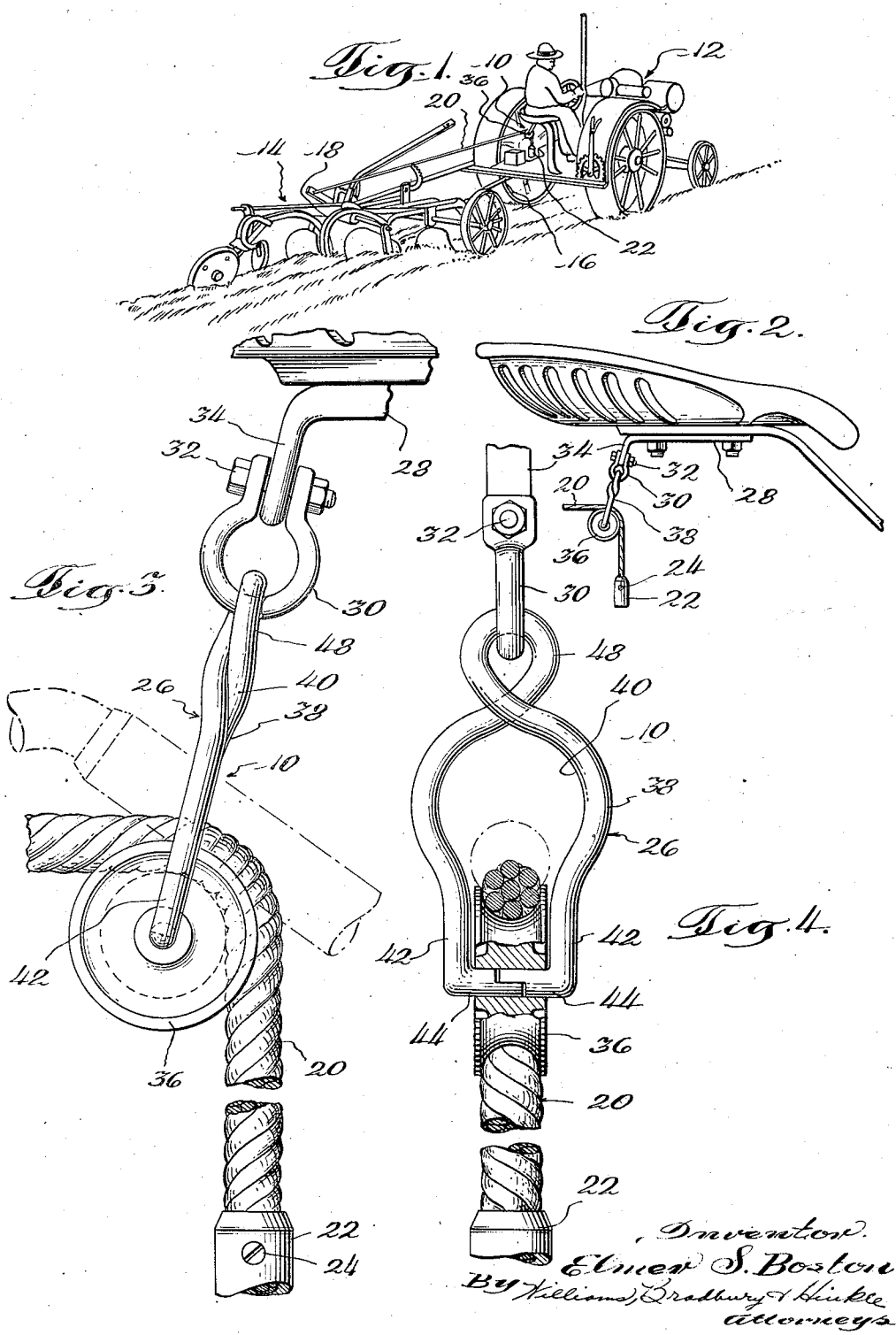

2,444,974

UNITED STATES PATENT OFFICE 2,444,974

TRIP-ROPE TENSIONING AND RELEASING DEVICE

Elmer S. Boston, Earlville, Ill.

Application September 21, 1944, Serial No. 555,181

3 Claims. (Cl. 280—150)

My invention relates to novel tensioning and releasing devices for tractor trip-ropes and which may conveniently be called a releasable tensioning device.

The object of my invention is, in the main, to provide a new and improved tractor trip-rope holder which automatically maintains the trip-rope taut for all varying relationships between the tractor and an agricultural implement drawn by it, such as a plow, and which automatically releases the trip-rope in the event the implement is disconnected from the plow as a result of striking an obstruction, or for any other reason.

Many agricultural implements are tractor drawn and are so connected to the tractor that if an obstruction is encountered, the implement is automatically disconnected or unhitched from the tractor. Thus, should the implement strike a rock or other obstruction, the implement stops immediately while the tractor continues to travel until stopped by the operator. The connection is usually of such a nature that the tractor and implement may occupy various angular positions relative to each other.

Many implements have parts which may be moved relative to others. This is particularly true of gang plows. These have blades or shares which may be raised or lowered relative to the plow frame or chassis. The adjustment of the blades or shares is ordinarily done by the operator of the tractor through a rope, commonly called a trip-rope, secured as to a suitable control lever on the plow so that when the rope is pulled, the blades may be either raised or lowered.

In the past, several arrangements, all excessively complex and expensive, have been proposed detachably to secure one end of the trip-rope to a part of the tractor and make it available to the driver. Not only are these devices complicated and expensive, but they do not provide for any easy adjustability of the rope length and they do not maintain the rope taut and easily available so that the rope is always conveniently accessible to the driver.

It is thus the primary object of my invention to provide a novel trip-rope releasing and tensioning device.

It is a further object of my invention to provide a new and improved and exceedingly inexpensive trip-rope releasing device.

Other objects and advantages of my invention will become apparent from the ensuing description of one embodiment thereof, in the course of which reference is had to the accompanying drawing, in which:

Fig. 1 is a perspective view illustrating my releasable tensioning device applied to a tractor drawn gang plow;

Fig. 2 is an enlarged fragmentary side elevational view of the device illustrating, in particular, the device attached to the tractor driver's seat;

Fig. 3 is a further enlarged fragmentary side elevational view of the device; and Fig. 4 is a similar end elevational view of the device.

Referring now to the drawings and particularly to Fig. 1, the releasable tensioning device of my invention, which is indicated generally and as a whole by reference character 10, is shown in association with means, such as a tractor 12, for drawing an agricultural implement, in this case a gang plow 14. The tractor and gang plow, and also the hitch or connection 16 between the two, may all be of conventional construction and for this reason detailed description of them is not deemed necessary. It is believed sufficient to state that the connection is of the releasable type, i. e., the plow is automatically disconnected from the tractor when the draw exceeds a certain value. It also enables the tractor and plow to occupy various angular positions relative to each other.

The gang plow also includes blades or shares 18 which may be raised or lowered in conventional manner by manipulation of a trip-rope 20 extending between the plow and the tractor and having one end fixedly secured to a control or operating lever associated with the plow.

The releasable tensioning device 10 of my invention automatically maintains the trip-rope taut at all times and also automatically releases the rope from the tractor in the event the plow is disconnected from the tractor.

In brief, the device includes a weight secured to the free end of the rope and means for movably and releasably securing the rope to the tractor intermediate its ends so that the weight maintains the rope taut and the rope may be readily freed from the tractor when the latter moves away from the plow.

The rope 20 is movably and releasably secured to a part of the tractor, preferably the tractor seat, and it is kept taut as by a relatively small weight 22 secured to the end of the rope as by a set screw 24 (see Fig. 3), whereby the rope is easily accessible to the driver at all times. The weight is preferably of small diameter so that it will not occupy much space and may be freed readily along with the rope in a manner to be described shortly.

The rope and weight are movably supported on the tractor, preferably by a pulley 36 secured underneath the driver's seat as to a bar or bracket 28 by suitable fastening means in such fashion that it may readily move to various angular positions relative to the tractor. The fastening means may be a shackle 30 loosely secured as by a bolt 32 to a lug 34 on bracket 28, although other convenient means for supporting the pulley may be used. If desired the pulley could be attached to the seat by wire or the like.

The rope 20 rides upon the pulley wheel 36 so that the weight 22 maintains it taut no matter what the relation of the plow and tractor. Thus there is no danger or likelihood of the rope becoming entangled with the machinery.

When the plow is disconnected from the tractor when the latter is moving, the rope is disconnected from the tractor as the latter moves away from the plow. The end of the rope connected to the plow remains fixed while the other (weighted) end is drawn upwardly and through the pulley frame or block 38 of novel construction and having an enlarged opening 40 above the pulley wheel through which the rope and weight pass.

The pulley frame 38 is preferably made of a single piece of relatively heavy, round metallic stock. It is formed with parallel portions 42 guiding the pulley wheel and oppositely extending and abutting ends 44 upon which the pulley wheel 36 is journalled for rotation. The ends are slotted oppositely and overlapped to increase the strength of the construction. The upper end of the frame, i. e., above the enlarged aperture 40, is twisted through 180 degrees to provide a relatively small loop 48 through which shackle 30 is passed.

The operation and advantages of my novel releasable trip-rope tensioning device may be apparent from the foregoing detailed description thereof. However, briefly to review them it may be noted that the weight 22 can be secured to one end of the rope in a simple manner and that the other end of the rope may then be attached to a plow or other implement. The pulley can be secured to the tractor or other drawing means in the manner illustrated and described or simply as by the use of wire or the like. The weighted end of the rope is then passed through the aperture 40 in the pulley whereby the device is installed and ready for operation.

The trip-rope is kept taut at all times no matter what the relative positions of the tractor and plow are. Furthermore, the rope is easily releasable from the tractor in the event the plow stops and the tractor continues to move. Furthermore, the two functions of maintaining the rope taut and the releasing of the rope are accomplished through a single simple device. Among the other advantages of the device may be noted the following: (1) the rope is easily accessible and remains at substantially the same location at all times; (2) the device is adapted quickly to be installed either initially or after it has been released as described above; and (3) the length of the rope may be so chosen that it can be easily used with different implements normally requiring different rope lengths.

While but a single embodiment of my invention has been illustrated and described in detail, it is contemplated that the principles of my invention may be embodied in different forms of apparatus and that the device may be used with various types of equipment, and not only the tractor and plow specifically described. It should, therefore, be understood that the details of the described embodiment are not limitative of the invention except in so far as set forth in the accompanying claims.

What I claim as new and desire to secure by Letters Patent of the United States is:

1. A releasable tensioning device for a trip-rope used with agricultural implements detachably connected to means for drawing the implement, including in combination, means secured to the drawing means for movably supporting the trip-rope intermediate its ends, said means being apertured to receive the rope, and a weight secured to the trip-rope beyond said supporting means, said weight being sufficient to hold the rope taut and of a size to pass through the aperture in said supporting means, whereby said weight maintains the rope taut and releasably secured the trip-rope to the drawing means.

2. A releasable tensioning device for a trip-rope used with agricultural implements detachably connected to means for drawing the implement, including in combination, means movably secured to the drawing means and apertured movably to receive and support thereon the trip-rope intermediate the ends of the latter, and a weight secured to the trip-rope beyond said supporting means, said weight being sufficient to hold the rope taut and of a size to pass through the aperture in said supporting means, whereby said weight maintains the rope taut and releasably secures the trip-rope to the drawing means.

3. A releasable tensioning device for a trip-rope used with agricultural implements detachably connected to means for drawing the implement, including in combination, a pulley movably secured to the drawing means and through which extends the free end of the trip-rope and having an enlarged opening radially outward of the pulley wheel, and a weight secured to the trip-rope beyond said supporting means, said weight being sufficient to hold the rope taut and of a size to pass through the opening in said pulley, whereby said weight maintains the rope taut and releasably secures the trip-rope to the drawing means.

ELMER S. BOSTON.

REFERENCES CITED

The following references are of record in the file of this patent:

UNITED STATES PATENTS

| Number | Name | Date |
| --- | --- | --- |
| 906,999 | Bourque | Dec. 15, 1908 |
| 1,423,785 | Wilde | July 25, 1922 |
| 1,476,787 | Adelmann | Dec. 11, 1923 |
| 1,725,369 | Rachlin | Aug. 20, 1929 |
| 1,765,492 | Lucas | June 24, 1930 |
| 1,786,314 | Passmel | Dec. 23, 1930 |
| 1,800,700 | Patton | Apr. 14, 1931 |
| 1,807,038 | Holden | May 26, 1931 |
| 2,036,953 | Morris | Apr. 7, 1936 |